(12) United States Patent
Li et al.

(10) Patent No.: US 10,409,972 B2
(45) Date of Patent: Sep. 10, 2019

(54) FINGERPRINT RECOGNITION METHOD AND MOBILE TERMINAL

(71) Applicant: Huawei Technologies Co., Ltd., Shenzhen (CN)

(72) Inventors: Ru Li, Shenzhen (CN); Huangwei Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

(21) Appl. No.: 15/579,793

(22) PCT Filed: Aug. 19, 2015

(86) PCT No.: PCT/CN2015/087531
§ 371 (c)(1),
(2) Date: Dec. 5, 2017

(87) PCT Pub. No.: WO2017/028277
PCT Pub. Date: Feb. 23, 2017

(65) Prior Publication Data
US 2018/0173862 A1 Jun. 21, 2018

(51) Int. Cl.
*G06F 21/32* (2013.01)
(52) U.S. Cl.
CPC .................. *G06F 21/32* (2013.01)
(58) Field of Classification Search
CPC .................................................. G06F 21/32
(Continued)

(56) References Cited

U.S. PATENT DOCUMENTS 8,806,481 B2 * 8/2014 Ali .................. H04L 9/3231
718/1
9,225,695 B1 * 12/2015 Riera ................ H04L 9/0861
(Continued)

FOREIGN PATENT DOCUMENTS

CN 103150514 A 6/2013
CN 104036176 A 9/2014
(Continued)

OTHER PUBLICATIONS

Machine Translation and Abstract of Chinese Publication No. CN103150514, dated Jun. 12, 2013, 18 pages.
(Continued)

*Primary Examiner* — Taghi T Arani
*Assistant Examiner* — Badridot Champakesanatusptodotgov
(74) *Attorney, Agent, or Firm* — Conley Rose, P.C.

(57) ABSTRACT

A fingerprint recognition method includes obtaining, by the mobile terminal, verification information and to-be-verified fingerprint information in a first operating system. The method includes, if the mobile terminal determines, in the first operating system according to the verification information, to perform first-type verification on the to-be-verified fingerprint information, directly invoking, by the mobile terminal, the first fingerprint interface in the first operating system to verify the to-be-verified fingerprint information. The method additionally includes, if the mobile terminal determines, in the first operating system according to the verification information, to perform second-type verification on the to-be-verified fingerprint information, switching, by the mobile terminal, from the first operating system to the second operating system, and invoking the second fingerprint interface in the second operating system to verify the to-be-verified fingerprint information.

10 Claims, 5 Drawing Sheets

(58) Field of Classification Search
USPC .......................................................... 726/18
See application file for complete search history.

(56) References Cited

U.S. PATENT DOCUMENTS

| | | | | |
|---|---|---|---|---|
| 9,792,460 | B2* | 10/2017 | An ........................... | G06F 21/74 |
| 2007/0282757 | A1* | 12/2007 | Pandya ................... | G06F 21/31 |
| | | | | 705/76 |
| 2008/0022364 | A1* | 1/2008 | Oikawa ................... | G06F 21/34 |
| | | | | 726/2 |
| 2008/0211627 | A1* | 9/2008 | Shinzaki ................. | G06F 21/32 |
| | | | | 340/5.82 |
| 2010/0148922 | A1* | 6/2010 | Yamada ................... | G06F 21/32 |
| | | | | 340/5.82 |
| 2013/0227262 | A1* | 8/2013 | Maya ..................... | G06F 21/575 |
| | | | | 713/2 |
| 2015/0135108 | A1* | 5/2015 | Pope ................... | G06K 9/00006 |
| | | | | 715/767 |
| 2017/0064551 | A1* | 3/2017 | Block ..................... | G06F 21/74 |

FOREIGN PATENT DOCUMENTS

| | | |
|---|---|---|
| CN | 104462935 A | 3/2015 |
| CN | 104615927 A | 5/2015 |
| CN | 104778393 A | 7/2015 |
| EP | 2892002 A2 | 7/2015 |
| WO | 2013173838 A2 | 11/2013 |

OTHER PUBLICATIONS

Machine Translation and Abstract of Chinese Publication No. CN104036176, dated Sep. 10, 2014, 20 pages.
Machine Translation and Abstract of Chinese Publication No. CN104615927, dated May 13, 2015, 20 pages.
Machine Translation and Abstract of Chinese Publication No. CN104778393, dated Jul. 5, 2015, 14 pages.
"Trusted User Interface API for Fingerprint Biometrics," GlobalPlatform Device Technology, Version 0.09, GPD_SPE_042, Draft, dated Jun. 2013, 48 pages.
Foreign Communication From A Counterpart Application, PCT Application No. PCT/CN2015/087531, English Translation of International Search Report dated May 19, 2016, 2 pages.
Machine Translation and Abstract of Chinese Publication No. CN104462935, Mar. 25, 2015, 13 pages.
Foreign Communication From A Counterpart Application, Chinese Application No. 201580077254.6, Chinese Office Action dated May 8, 2019, 5 pages.

* cited by examiner

FINGERPRINT RECOGNITION METHOD AND MOBILE TERMINAL

CROSS-REFERENCE TO RELATED APPLICATION

This application is a National Stage of International Application No. PCT/CN2015/087531, filed on Aug. 19, 2015, which is hereby incorporated by reference in its entirety.

TECHNICAL FIELD

Embodiments of the present invention relate to computer technologies, and in particular, to a fingerprint recognition method and a mobile terminal.

BACKGROUND

With scientific and technological progress, a fingerprint recognition technology is gradually integrated into a computer technology. Fingerprint applications on an existing mobile terminal generally include security-related applications and non-security-related applications. Examples of the security-related applications are fingerprint-based payment applications. The non-security-related applications are applications such as piano playing or font adjustment. There may be two execution environments on the existing mobile terminal, such as a rich execution environment (REE) and a trusted execution environment (TEE). Each execution environment includes an application, an operating system (OS), a driver module, and the like. (1) An OS included in the REE is a rich operating system (Rich OS) (optionally, the operating system is configured to generate and maintain a standard runtime environment, and is an operating system that has a strong processing capability and a multimedia function), such as an Android operating system. An application included in the REE is a client application (CA). (2) An OS included in the TEE is a trusted operating system (Trusted OS) (optionally, the operating system is configured to generate and maintain a secure runtime environment, and is a trusted operating system that has a secure processing capability and that provides a secure peripheral operation). An application included in the TEE is a trusted application (TA). The Trusted OS and the Rich OS are operating systems coexisting on the mobile terminal. Software and hardware resources of the Trusted OS are isolated from those of the Rich OS. In addition, the Trusted OS may provide a security service for the Rich OS. The CA may establish a session connection with the TA in the TEE by using a system switchover interface (such as a TEE client interface or a TEE function interface) (the system switchover interface is configured to provide a channel for establishing the session connection with the TA by the CA). The TA running in the Trusted OS that is isolated from the Rich OS may provide a related security function for the CA in the REE or another TA in the TEE, so as to prevent an attack of software/malicious software.

In the prior art, a fingerprint verification function is integrated into the TEE to ensure security of fingerprint information. Therefore, when fingerprint verification needs to be performed for any CA running in the Rich OS on the mobile terminal, switchover to the TEE needs to be first performed by using the system switchover interface (such as the TEE client interface), and a session connection needs to be established with a TA in the TEE. Further, the TA invokes a TEE fingerprint interface (such as a TEE FingerPrint API) for fingerprint verification.

It can be learned that, at present, fingerprint verification can be performed only in a secure runtime environment in the prior art, and a verification manner is monotonous.

SUMMARY

Embodiments of the present invention provide a fingerprint recognition method and a mobile terminal, thereby adding a fingerprint verification manner and improving flexibility of performing fingerprint verification by a mobile terminal.

According to a first aspect, an embodiment of the present invention provides a fingerprint recognition method, where the method is applied to a mobile terminal; the mobile terminal includes a first operating system and a second operating system, where the first operating system and the second operating system independently run on the mobile terminal, the first operating system includes a first fingerprint interface, and the second operating system includes a second fingerprint interface; and the method includes obtaining, by the mobile terminal, verification information and to-be-verified fingerprint information in the first operating system; and if the mobile terminal determines, in the first operating system according to the verification information, to perform first-type verification on the to-be-verified fingerprint information, directly invoking, by the mobile terminal, the first fingerprint interface in the first operating system to verify the to-be-verified fingerprint information; or if the mobile terminal determines, in the first operating system according to the verification information, to perform second-type verification on the to-be-verified fingerprint information, switching, by the mobile terminal, from the first operating system to the second operating system, and invoking the second fingerprint interface in the second operating system to verify the to-be-verified fingerprint information.

With reference to the first aspect, in a first possible implementation of the first aspect, the verification information includes a verification security level; the determining, by the mobile terminal in the first operating system according to the verification information, to perform first-type verification on the to-be-verified fingerprint information includes: if the verification security level is lower than a first preset security level, determining, by the mobile terminal in the first operating system according to the verification information, to perform the first-type verification on the to-be-verified fingerprint information; and the determining, by the mobile terminal in the first operating system according to the verification information, to perform second-type verification on the to-be-verified fingerprint information includes: if the verification security level is higher than or equal to the first preset security level, determining, by the mobile terminal in the first operating system according to the verification information, to perform the second-type verification on the to-be-verified fingerprint information.

With reference to the first aspect, in a second possible implementation of the first aspect, the verification information includes a verification speed; the determining, by the mobile terminal in the first operating system according to the verification information, to perform first-type verification on the to-be-verified fingerprint information includes: if the verification speed is greater than or equal to a first preset verification speed, determining, by the mobile terminal in the first operating system according to the verification information, to perform the first-type verification on the to-be-verified fingerprint information; and the determining, by the mobile terminal in the first operating system according to the verification information, to perform second-type verification on the to-be-verified fingerprint information includes: if the verification speed is less than the first preset verification speed, determining, by the mobile terminal in the first operating system according to the verification information, to perform the second-type verification on the to-be-verified fingerprint information.

With reference to the first aspect, in a third possible implementation of the first aspect, the verification information includes a verification threshold; the determining, by the mobile terminal in the first operating system according to the verification information, to perform first-type verification on the to-be-verified fingerprint information includes: if the verification threshold is less than a first preset verification threshold, determining, by the mobile terminal in the first operating system according to the verification information, to perform the first-type verification on the to-be-verified fingerprint information; and the determining, by the mobile terminal in the first operating system according to the verification information, to perform second-type verification on the to-be-verified fingerprint information includes: if the verification threshold is greater than or equal to the first preset verification threshold, determining, by the mobile terminal in the first operating system according to the verification information, to perform the second-type verification on the to-be-verified fingerprint information.

With reference to the first aspect, in a fourth possible implementation of the first aspect, the verification information includes at least two types of the following verification information: a verification security level, a verification threshold, or a verification speed; and the method further includes: obtaining, by the mobile terminal in the first operating system, priorities of the at least two types of verification information; the determining, by the mobile terminal in the first operating system according to the verification information, to perform first-type verification on the to-be-verified fingerprint information includes: determining, by the mobile terminal in the first operating system according to verification information that has a highest priority in the at least two types of verification information, to perform the first-type verification on the to-be-verified fingerprint information; and the determining, by the mobile terminal in the first operating system according to the verification information, to perform second-type verification on the to-be-verified fingerprint information includes: determining, by the mobile terminal in the first operating system according to verification information that has a highest priority in the at least two types of verification information, to perform the second-type verification on the to-be-verified fingerprint information.

With reference to the first aspect, in a fifth possible implementation of the first aspect, the verification information includes a verification security level and a verification speed; the determining, by the mobile terminal in the first operating system according to the verification information, to perform second-type verification on the to-be-verified fingerprint information includes: if the verification security level is higher than or equal to a first preset security level and the verification speed is less than a first preset verification speed, determining, by the mobile terminal in the first operating system according to the verification information, to perform the second-type verification on the to-be-verified fingerprint information; and the determining, by the mobile terminal in the first operating system according to the verification information, to perform first-type verification on the to-be-verified fingerprint information includes: if the verification security level is lower than the first preset security level and the verification speed is greater than or equal to the first preset verification speed, determining, by the mobile terminal in the first operating system according to the verification information, to perform the first-type verification on the to-be-verified fingerprint information.

With reference to the first aspect, in a sixth possible implementation of the first aspect, the verification information includes a verification security level, a verification threshold, and a verification speed; the determining, by the mobile terminal in the first operating system according to the verification information, to perform second-type verification on the to-be-verified fingerprint information includes: if the verification security level is higher than or equal to a first preset security level, the verification threshold is greater than or equal to a first preset verification threshold, and the verification speed is less than a first preset verification speed, determining, by the mobile terminal in the first operating system according to the verification information, to perform the second-type verification on the to-be-verified fingerprint information; and the determining, by the mobile terminal in the first operating system according to the verification information, to perform first-type verification on the to-be-verified fingerprint information includes: if the verification security level is lower than the first preset security level, the verification threshold is less than the first preset verification threshold, and the verification speed is greater than or equal to the first preset verification speed, determining, by the mobile terminal in the first operating system according to the verification information, to perform the first-type verification on the to-be-verified fingerprint information.

According to a second aspect, an embodiment of the present invention provides a mobile terminal, where the mobile terminal includes a first operating system and a second operating system, where the first operating system and the second operating system independently run on the mobile terminal, the first operating system includes a first fingerprint interface, and the second operating system includes a second fingerprint interface; and the mobile terminal includes: an obtaining module, configured to obtain verification information and to-be-verified fingerprint information in the first operating system; and a verification module, configured to: if it is determined, in the first operating system according to the verification information, that first-type verification is to be performed on the to-be-verified fingerprint information, directly invoke the first fingerprint interface in the first operating system to verify the to-be-verified fingerprint information; or if it is determined, in the first operating system according to the verification information, that second-type verification is to be performed on the to-be-verified fingerprint information, switch from the first operating system to the second operating system, and invoke the second fingerprint interface in the second operating system to verify the to-be-verified fingerprint information.

With reference to the second aspect, in a first possible implementation of the second aspect, the verification information includes a security level, and the verification module is further configured to: if the verification security level is lower than a first preset security level, determine, in the first operating system according to the verification information, to perform the first-type verification on the to-be-verified fingerprint information; or if the verification security level is higher than or equal to the first preset security level, determine, in the first operating system according to the verification information, to perform the second-type verification on the to-be-verified fingerprint information.

With reference to the second aspect, in a second possible implementation of the second aspect, the verification information includes a verification speed, and the verification module is further configured to: if the verification speed is greater than or equal to a first preset verification speed, determine, in the first operating system according to the verification information, to perform the first-type verification on the to-be-verified fingerprint information; or if the verification speed is less than the first preset verification speed, determine, in the first operating system according to the verification information, to perform the second-type verification on the to-be-verified fingerprint information.

With reference to the second aspect, in a third possible implementation of the second aspect, the verification information includes a verification threshold, and the verification module is further configured to: if the verification threshold is less than a first preset verification threshold, determine, in the first operating system according to the verification information, to perform the first-type verification on the to-be-verified fingerprint information; or if the verification threshold is greater than or equal to the first preset verification threshold, determine, in the first operating system according to the verification information, to perform the second-type verification on the to-be-verified fingerprint information.

With reference to the second aspect, in a fourth possible implementation of the second aspect, the verification information includes at least two types of the following verification information: a verification security level, a verification threshold, or a verification speed; and the verification module is further configured to: obtain, in the first operating system, priorities of the at least two types of verification information; and determine, in the first operating system according to verification information that has a highest priority in the at least two types of verification information, a verification type of verifying the to-be-verified fingerprint information, where the verification type includes one of the following: the first-type verification or the second-type verification.

With reference to the second aspect, in a fifth possible implementation of the second aspect, the verification information includes a verification security level and a verification speed, and the verification module is further configured to: if the verification security level is higher than or equal to a first preset security level and the verification speed is less than a first preset verification speed, determine, in the first operating system according to the verification information, to perform the second-type verification on the to-be-verified fingerprint information; or if the verification security level is lower than the first preset security level and the verification speed is greater than or equal to the first preset verification speed, determine, in the first operating system according to the verification information, to perform the first-type verification on the to-be-verified fingerprint information.

With reference to the second aspect, in a sixth possible implementation of the second aspect, the verification information includes a verification security level, a verification threshold, and a verification speed, and the verification module is further configured to: if the verification security level is higher than or equal to a first preset security level, the verification threshold is greater than or equal to a first preset verification threshold, and the verification speed is less than a first preset verification speed, determine, in the first operating system according to the verification information, to perform the second-type verification on the to-be-verified fingerprint information; or if the verification security level is lower than the first preset security level, the verification threshold is less than the first preset verification threshold, and the verification speed is greater than or equal to the first preset verification speed, determine, in the first operating system according to the verification information, to perform the first-type verification on the to-be-verified fingerprint information.

According to a third aspect, an embodiment of the present invention provides a mobile terminal, including a processor, a memory, and a fingerprint sensor, where the memory is configured to store a first operating system and a second operating system, where the first operating system and the second operating system independently run on the processor, the first operating system includes a first fingerprint interface, and the second operating system includes a second fingerprint interface; the fingerprint sensor is configured to collect to-be-verified fingerprint information; and the processor is configured to: obtain verification information in the first operating system; and if it is determined, in the first operating system according to the verification information, that first-type verification is to be performed on the to-be-verified fingerprint information, directly invoke the first fingerprint interface in the first operating system to verify the to-be-verified fingerprint information; or if it is determined, in the first operating system according to the verification information, that second-type verification is to be performed on the to-be-verified fingerprint information, switch from the first operating system to the second operating system, and invoke the second fingerprint interface in the second operating system to verify the to-be-verified fingerprint information.

With reference to the third aspect, in a first possible implementation of the third aspect, the verification information includes a verification security level, and the processor is further configured to: if the verification security level is lower than a first preset security level, determine, in the first operating system according to the verification information, to perform the first-type verification on the to-be-verified fingerprint information; or if the verification security level is higher than or equal to the first preset security level, determine, in the first operating system according to the verification information, to perform the second-type verification on the to-be-verified fingerprint information.

With reference to the third aspect, in a second possible implementation of the third aspect, the verification information includes a verification speed, and the processor is further configured to: if the verification speed is greater than or equal to a first preset verification speed, determine, in the first operating system according to the verification information, to perform the first-type verification on the to-be-verified fingerprint information; or if the verification speed is less than the first preset verification speed, determine, in the first operating system according to the verification information, to perform the second-type verification on the to-be-verified fingerprint information.

With reference to the third aspect, in a third possible implementation of the third aspect, the verification information includes a verification threshold, and the processor is further configured to: if the verification threshold is less than a first preset verification threshold, determine, in the first operating system according to the verification information, to perform the first-type verification on the to-be-verified fingerprint information; or if the verification threshold is greater than or equal to the first preset verification threshold, determine, in the first operating system according to the verification information, to perform the second-type verification on the to-be-verified fingerprint information.

With reference to the third aspect, in a fourth possible implementation of the third aspect, the verification information includes at least two types of the following verification information: a verification security level, a verification threshold, or a verification speed; and the processor is further configured to: obtain, in the first operating system, priorities of the at least two types of verification information; and determine, in the first operating system according to verification information that has a highest priority in the at least two types of verification information, a verification type of verifying the to-be-verified fingerprint information, where the verification type includes one of the following: the first-type verification or the second-type verification.

With reference to the third aspect, in a fifth possible implementation of the third aspect, the verification information includes a verification security level and a verification speed, and the processor is further configured to: if the verification security level is higher than or equal to a first preset security level and the verification speed is less than a first preset verification speed, determine, in the first operating system according to the verification information, to perform the second-type verification on the to-be-verified fingerprint information; or if the verification security level is lower than the first preset security level and the verification speed is greater than or equal to the first preset verification speed, determine, in the first operating system according to the verification information, to perform the first-type verification on the to-be-verified fingerprint information.

With reference to the third aspect, in a sixth possible implementation of the third aspect, the verification information includes a verification security level, a verification threshold, and a verification speed, and the processor is further configured to: if the verification security level is higher than or equal to a first preset security level, the verification threshold is greater than or equal to a first preset verification threshold, and the verification speed is less than a first preset verification speed, determine, in the first operating system according to the verification information, to perform the second-type verification on the to-be-verified fingerprint information; or if the verification security level is lower than the first preset security level, the verification threshold is less than the first preset verification threshold, and the verification speed is greater than or equal to the first preset verification speed, determine, in the first operating system according to the verification information, to perform the first-type verification on the to-be-verified fingerprint information.

In the present invention, the mobile terminal obtains the verification information and the to-be-verified fingerprint information in the first operating system. Further, the mobile terminal determines, in the first operating system, a type of the verification information according to the verification information. If the verification information is first-type verification information, the mobile terminal directly invokes the first fingerprint interface in the first operating system to perform fingerprint verification on the to-be-verified fingerprint information. If the verification information is second-type verification information, the mobile terminal switches from the first operating system to the second operating system, and invokes the second fingerprint interface in the second operating system to perform fingerprint verification on the to-be-verified fingerprint information. It can be learned that, the mobile terminal in the present invention may flexibly select a corresponding fingerprint interface according to the type of the verification information, to perform fingerprint verification on the to-be-verified fingerprint information.

DESCRIPTION OF EMBODIMENTS

Figure 1:
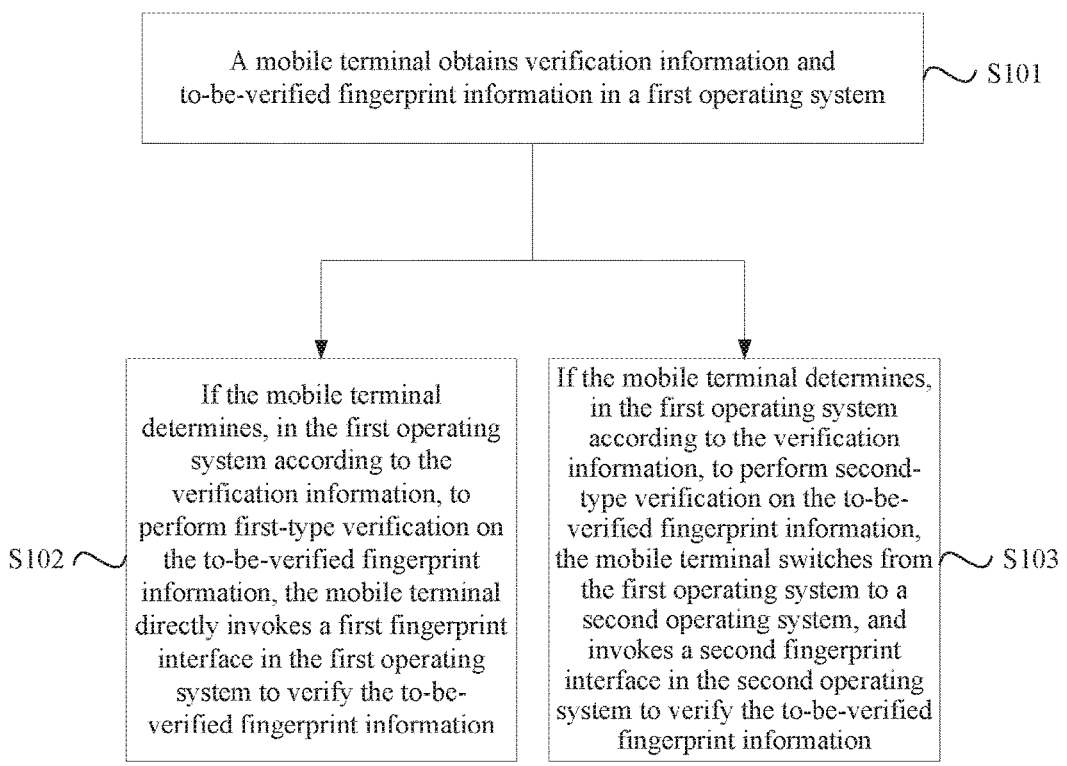
FIG. 1 is a schematic flowchart of Embodiment 1 of a fingerprint recognition method according to the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

In this application, a mobile terminal includes but is not limited to a mobile phone, a mobile computer, a tablet computer, a personal digital assistant (PDA), a media player, a smartphone, a smart television, a smart watch, smart glasses, a smart band, and the like.

Optionally, a first operating system mentioned in this application is configured to generate and maintain a standard runtime environment (optionally, the first operating system may be a Rich OS), such as an Android operating system, the IOS, or another operating system. This application sets no limitation thereon. A second operating system mentioned in this application is configured to generate and maintain a secure runtime environment (optionally, the second operating system may be a Trusted OS). The first operating system and the second operating system independently run on the mobile terminal. The secure runtime environment is generally an operating system that has a low storage requirement, for example, a known MobiGore operating system in the prior art. The Mobicore operating system is used in combination with a so-called secure runtime environment that is in a form of an ARM security zone (ARM TrustZone).

Optionally, a first operating system mentioned in this application is configured to generate and maintain a standard runtime environment, such as an Android operating system. This application sets no limitation thereon. A second operating system mentioned in this application is also configured to generate and maintain a standard runtime environment, such as a Windows operating system. This application sets no limitation thereon. The first operating system and the second operating system independently run on the mobile terminal.

Optionally, a first operating system mentioned in this application is configured to generate and maintain a secure runtime environment, such as a BLACKBERRY operating system. This application sets no limitation thereon. A second operating system mentioned in this application is also configured to generate and maintain a secure runtime environment, such as a Trusted OS. This application sets no limitation thereon. The first operating system and the second operating system independently run on the mobile terminal.

Optionally, first-type verification mentioned in this application may be non-security verification, and correspondingly, second-type verification is security verification. Alternatively, first-type verification may be high-speed verification, and correspondingly, second-type verification may be low-speed verification. Alternatively, first-type verification may be low-threshold verification, and correspondingly, second-type verification may be high-threshold verification. Optionally, the first-type verification and the second-type verification that are mentioned in this application may be another type of verification. The present disclosure sets no limitation thereon.

The security verification mentioned in this application indicates that the mobile terminal needs to perform fingerprint verification in the secure runtime environment. The fingerprint verification may relate to a security problem of a user and/or the mobile terminal. For example, a fingerprint is used to unlock a screen, or a fingerprint is used to perform secure payment. The non-security verification indicates that the mobile terminal may perform fingerprint verification in the standard runtime environment. The fingerprint verification does not relate to a security problem of a user and/or the mobile terminal. For example, a fingerprint is used for piano playing, soft keyboard guidance, or font adjustment.

The low-speed verification mentioned in this application indicates that the mobile terminal needs to perform fingerprint verification in the secure runtime environment. The fingerprint verification may relate to a security problem of a user and/or the mobile terminal. For example, a fingerprint is used to unlock a screen, or a fingerprint is used to perform secure payment. The fingerprint verification generally has no requirement for a verification speed of the fingerprint verification. The high-speed verification indicates that the mobile terminal may perform fingerprint verification in the standard runtime environment. The fingerprint verification does not relate to a security problem of a user and/or the mobile terminal, but has a relatively high requirement for a verification speed, and requires fast fingerprint recognition. For example, a fingerprint is used for piano playing, soft keyboard guidance, or font adjustment.

The high-threshold verification mentioned in this application indicates that the mobile terminal needs to perform fingerprint verification in the secure runtime environment. The fingerprint verification may relate to a security problem of a user and/or the mobile terminal. For example, a fingerprint is used to unlock a screen, or a fingerprint is used to perform secure payment. The fingerprint verification generally has a relatively high requirement for a verification threshold of the fingerprint verification. The low-threshold verification indicates that the mobile terminal may perform fingerprint verification in the standard runtime environment. The fingerprint verification does not relate to a security problem of a user and/or the mobile terminal, and has a relatively low requirement for a verification threshold. For example, a fingerprint is used for piano playing, soft keyboard guidance, or font adjustment.

Optionally, when the verification information includes a verification security level, a verification type of to-be-verified fingerprint information is determined according to the verification information in the following manner: if the verification security level is higher than or equal to a first preset security level (a security criterion used to determine the verification security level), determining to perform security verification (that is, second-type verification) on the to-be-verified fingerprint information; or if the verification security level is lower than the first preset security level, determining to perform non-security verification (that is, first-type verification) on the to-be-verified fingerprint information.

Optionally, when the verification information includes a verification speed, a verification type of to-be-verified fingerprint information is determined according to the verification information in the following manner: if the verification speed is greater than or equal to a first preset verification speed (a criterion used to determine a high or low verification speed), determining to perform high-speed verification (that is, first-type verification) on the to-be-verified fingerprint information; or if the verification speed is less than the first preset verification speed, determining to perform low-speed verification (that is, second-type verification) on the to-be-verified fingerprint information.

Optionally, when the verification information includes a verification threshold, a verification type of to-be-verified fingerprint information is determined according to the verification information in the following manner: if the verification threshold is greater than or equal to a first preset verification threshold, determining to perform high-threshold verification (that is, second-type verification) on the to-be-verified fingerprint information; or if the verification threshold is less than the first preset verification threshold, determining to perform low-threshold verification (that is, first-type verification) on the to-be-verified fingerprint information.

Optionally, when verification information includes at least two types of the following verification information: a verification security level, a verification speed, or a verification threshold, a verification type of to-be-verified fingerprint information is determined according to the verification information in the following manner: obtaining, by the mobile terminal in the first operating system, priorities of the at least two types of verification information; and further, determining, according to verification information that has a highest priority in the at least two types of verification information, the verification type of verifying the to-be-verified fingerprint information. Optionally, it is preset that a priority of the verification security level is higher than a priority of the verification speed and the priority of the verification speed is higher than a priority of the verification threshold. For example, when the verification information includes the verification security level and the verification speed, the verification type of the to-be-verified fingerprint information is determined according to the verification security level as follows: if the verification security level is higher than or equal to a first preset security level, determining to perform security verification on the to-be-verified fingerprint information; or if the verification security level is lower than the first preset security level, determining to perform non-security verification on the to-be-verified fingerprint information.

Optionally, when verification information includes a verification security level and a verification speed, a verification type of to-be-verified fingerprint information is determined according to the verification information in the following manner: if the verification security level is higher than or equal to the first preset security level and the verification speed is less than the first preset verification speed, determining, by the mobile terminal in the first operating system, to perform second-type verification on the to-be-verified fingerprint information; or if the verification security level is lower than the first preset security level and the verification speed is greater than or equal to the first preset verification speed, determining, by the mobile terminal in the first operating system, to perform first-type verification on the to-be-verified fingerprint information.

Optionally, when verification information includes a verification security level, a verification speed, and a verification threshold, a verification type of to-be-verified fingerprint information is determined according to the verification information in the following manner: if the verification security level is higher than or equal to the first preset security level, the verification threshold is greater than or equal to the first preset verification threshold, and the verification speed is less than the first preset verification speed, determining, by the mobile terminal in the first operating system, to perform second-type verification on the to-be-verified fingerprint information; or if the verification security level is lower than the first preset security level, the verification threshold is less than the first preset verification threshold, and the verification speed is greater than or equal to the first preset verification speed, determining, by the mobile terminal in the first operating system, to perform first-type verification on the to-be-verified fingerprint information.

To address monotony of a fingerprint verification manner in the prior art, a first fingerprint interface is added in the first operating system in this application. (1) If the mobile terminal determines, in the first operating system according to the verification information, to perform first-type verification (such as the non-security verification, the high-speed verification, or the low-threshold verification) on the to-be-verified fingerprint information, the mobile terminal may directly invoke the first fingerprint interface in the first operating system to verify the to-be-verified fingerprint information. (2) If the mobile terminal determines, in the first operating system according to the verification information, to perform second-type verification (such as the security verification, the low-speed verification, or the high-threshold verification) on the to-be-verified fingerprint information, the mobile terminal needs to switch from the first operating system to the second operating system, and invoke the second fingerprint interface in the second operating system to verify the to-be-verified fingerprint information. It can be learned that, the mobile terminal may flexibly select, according to the verification type, a corresponding fingerprint interface to perform fingerprint verification on the to-be-verified fingerprint information.

FIG. 1 is a schematic flowchart of Embodiment 1 of a fingerprint recognition method according to the present disclosure. A solution in this embodiment may be applied to a mobile terminal. The mobile terminal includes a first operating system and a second operating system. The first operating system and the second operating system independently run on the mobile terminal. The first operating system includes a first fingerprint interface. The second operating system includes a second fingerprint interface. This solution adds a fingerprint verification manner and improves flexibility of performing fingerprint verification by the mobile terminal. As shown in FIG. 1, the method in this embodiment may include the following steps.

S101. The mobile terminal obtains verification information and to-be-verified fingerprint information in the first operating system.

S102. If the mobile terminal determines, in the first operating system according to the verification information, to perform first-type verification on the to-be-verified fingerprint information, the mobile terminal directly invokes the first fingerprint interface in the first operating system to verify the to-be-verified fingerprint information.

S103. If the mobile terminal determines, in the first operating system according to the verification information, to perform second-type verification on the to-be-verified fingerprint information, the mobile terminal switches from the first operating system to the second operating system, and invokes the second fingerprint interface in the second operating system to verify the to-be-verified fingerprint information.

In this embodiment of the present disclosure, the mobile terminal obtains the verification information and the to-be-verified fingerprint information in the first operating system. The verification information is used to indicate a verification type (such as the first-type verification or the second-type verification) of the to-be-verified fingerprint information. Optionally, the verification information may include at least one type of the following verification information: a verification security level, a verification threshold, or a verification speed, or may include other verification information. This embodiment sets no limitation thereon. Optionally, after obtaining the verification information, the mobile terminal determines, in the first operating system according to the verification information, the verification type (such as the first-type verification or the second-type verification) of the to-be-verified fingerprint information, and further selects, according to a different verification type, one fingerprint interface from the first fingerprint interface and the second fingerprint interface to verify the to-be-verified fingerprint information.

Optionally, (1) the verification information includes the verification security level.

The determining, by the mobile terminal in the first operating system according to the verification information, to perform first-type verification on the to-be-verified fingerprint information includes if the verification security level is lower than a first preset security level, determining, by the mobile terminal in the first operating system according to the verification information, to perform the first-type verification on the to-be-verified fingerprint information.

The determining, by the mobile terminal in the first operating system according to the verification information, to perform second-type verification on the to-be-verified fingerprint information includes if the verification security level is higher than or equal to the first preset security level, determining, by the mobile terminal in the first operating system according to the verification information, to perform the second-type verification on the to-be-verified fingerprint information.

Optionally, (2) the verification information includes the verification speed.

The determining, by the mobile terminal in the first operating system according to the verification information, to perform first-type verification on the to-be-verified fingerprint information includes if the verification speed is greater than or equal to a first preset verification speed, determining, by the mobile terminal in the first operating system according to the verification information, to perform the first-type verification on the to-be-verified fingerprint information.

The determining, by the mobile terminal in the first operating system according to the verification information, to perform second-type verification on the to-be-verified fingerprint information includes if the verification speed is less than the first preset verification speed, determining, by the mobile terminal in the first operating system according to the verification information, to perform the second-type verification on the to-be-verified fingerprint information.

Optionally, (3) the verification information includes the verification threshold.

The determining, by the mobile terminal in the first operating system according to the verification information, to perform first-type verification on the to-be-verified fingerprint information includes if the verification threshold is less than a first preset verification threshold, determining, by the mobile terminal in the first operating system according to the verification information, to perform the first-type verification on the to-be-verified fingerprint information.

The determining, by the mobile terminal in the first operating system according to the verification information, to perform second-type verification on the to-be-verified fingerprint information includes if the verification threshold is greater than or equal to the first preset verification threshold, determining, by the mobile terminal in the first operating system according to the verification information, to perform the second-type verification on the to-be-verified fingerprint information.

Optionally, (4) the verification information includes the verification security level and the verification speed.

The determining, by the mobile terminal in the first operating system according to the verification information, to perform second-type verification on the to-be-verified fingerprint information includes if the verification security level is higher than or equal to a first preset security level and the verification speed is less than a first preset verification speed, determining, by the mobile terminal in the first operating system according to the verification information, to perform the second-type verification on the to-be-verified fingerprint information.

The determining, by the mobile terminal in the first operating system according to the verification information, to perform first-type verification on the to-be-verified fingerprint information includes if the verification security level is lower than the first preset security level and the verification speed is greater than or equal to the first preset verification speed, determining, by the mobile terminal in the first operating system according to the verification information, to perform the first-type verification on the to-be-verified fingerprint information.

Optionally, (5) the verification information includes the verification security level, the verification threshold, and the verification speed.

The determining, by the mobile terminal in the first operating system according to the verification information, to perform second-type verification on the to-be-verified fingerprint information includes if the verification security level is higher than or equal to a first preset security level, the verification threshold is greater than or equal to a first preset verification threshold, and the verification speed is less than a first preset verification speed, determining, by the mobile terminal in the first operating system according to the verification information, to perform the second-type verification on the to-be-verified fingerprint information.

The determining, by the mobile terminal in the first operating system according to the verification information, to perform first-type verification on the to-be-verified fingerprint information includes if the verification security level is lower than the first preset security level, the verification threshold is less than the first preset verification threshold, and the verification speed is greater than or equal to the first preset verification speed, determining, by the mobile terminal in the first operating system according to the verification information, to perform the first-type verification on the to-be-verified fingerprint information.

Optionally, the first preset security level, the first preset verification speed, and/or the first preset verification threshold provided in this embodiment may be set by a user, or may be preset by the first operating system in advance, or certainly, may be set in another manner. This embodiment sets no limitation thereon.

Optionally, (6) the verification information includes at least two types of the following verification information: the verification security level, the verification threshold, or the verification speed. The method further includes: obtaining, by the mobile terminal in the first operating system, priorities of the at least two types of verification information; the determining, by the mobile terminal in the first operating system according to the verification information, to perform first-type verification on the to-be-verified fingerprint information includes: determining, by the mobile terminal in the first operating system according to verification information that has a highest priority in the at least two types of verification information, to perform the first-type verification on the to-be-verified fingerprint information; and the determining, by the mobile terminal in the first operating system according to the verification information, to perform second-type verification on the to-be-verified fingerprint information includes: determining, by the mobile terminal in the first operating system according to verification information that has a highest priority in the at least two types of verification information, to perform the second-type verification on the to-be-verified fingerprint information.

In this embodiment of the present disclosure, optionally, it is preset that a priority of the verification security level is higher than a priority of the verification speed and the priority of the verification speed is higher than a priority of the verification threshold. For example, when the verification information includes the verification security level and the verification speed, the mobile terminal obtains, in the first operating system, priorities of the verification security level and the verification speed; further, determines, in the first operating system, the verification information that has a highest priority (that is, the verification security level) in the verification security level and the verification speed, and determines, according to the verification security level, the verification type of verifying the to-be-verified fingerprint information; and if the verification security level is higher than or equal to the first preset security level, determines to perform security verification (that is, the second-type verification) on the to-be-verified fingerprint information, or if the verification security level is lower than the first preset security level, determines to perform non-security verification (that is, the first-type verification) on the to-be-verified fingerprint information.

In this embodiment, if the mobile terminal determines, in the first operating system according to the verification information, to perform first-type verification (such as the non-security verification, high-speed verification, or low-threshold verification) on the to-be-verified fingerprint information, the mobile terminal directly invokes the first fingerprint interface in the first operating system to verify the to-be-verified fingerprint information, without a need of switching to the second operating system and invoking the second fingerprint interface to verify the to-be-verified fingerprint information. Therefore, verification efficiency of the first-type verification is improved, and a resource of the second operating system is saved.

In this embodiment, if the mobile terminal determines, in the first operating system according to the verification information, to perform second-type verification (such as the security verification, low-speed verification, or high-threshold verification) on the to-be-verified fingerprint information, the mobile terminal needs to first switch from the first operating system to the second operating system, and invoke the second fingerprint interface in the second operating system to verify the to-be-verified fingerprint information. Optionally, the mobile terminal invokes a system switchover interface in the first operating system to switch from the first operating system to the second operating system.

Optionally, in this embodiment of the present disclosure, the invoking, by the mobile terminal, the first fingerprint interface or the second fingerprint interface to verify the to-be-verified fingerprint information includes: invoking, by the mobile terminal, a corresponding fingerprint sensor driver module by using the first fingerprint interface or the second fingerprint interface; and invoking, by the fingerprint sensor driver module, a fingerprint sensor in the mobile terminal to perform fingerprint verification on the to-be-verified fingerprint information.

Optionally, in this embodiment of the present disclosure, the invoking, by the mobile terminal, the first fingerprint interface or the second fingerprint interface to verify the to-be-verified fingerprint information includes: invoking, by the mobile terminal, a verification program in a memory by using the first fingerprint interface or the second fingerprint interface, to perform fingerprint verification on the to-be-verified fingerprint information.

In this embodiment of the present disclosure, optionally, when a user triggers a fingerprint verification request operation, an application that runs in the first operating system of the mobile terminal may generate corresponding verification information according to a type of the fingerprint verification request operation, or the application obtains, by using a network-side server, verification information corresponding to the fingerprint verification request operation. In addition, the fingerprint sensor in the mobile terminal collects to-be-verified fingerprint information of the user. Further, the application sends the verification information to the first operating system. The first operating system determines, according to the verification information, a verification type (such as the first-type verification or the second-type verification) of the to-be-verified fingerprint information. Further, the first operating system returns a determined verification type result (such as the first-type verification or the second-type verification) to the application, so that the application flexibly selects, according to the verification type result, a corresponding fingerprint interface to perform fingerprint verification on the to-be-verified fingerprint information. (1) If the verification type is the first-type verification (such as the non-security verification, the high-speed verification, or the low-threshold verification), the application directly invokes the first fingerprint interface in the first operating system to verify the to-be-verified fingerprint information. (2) If the verification type is the second-type verification (such as the security verification, the low-speed verification, or the high-threshold verification), the application invokes the system switchover interface in the first operating system to switch to the second operating system, and invokes the second fingerprint interface in the second operating system to verify the to-be-verified fingerprint information.

In this embodiment of the present disclosure, optionally, when a user triggers a fingerprint verification request operation, an application that runs in the first operating system of the mobile terminal may generate corresponding verification information according to a type of the fingerprint verification request operation, or the application obtains, by using a network-side server, verification information corresponding to the fingerprint verification request operation. In addition, the fingerprint sensor in the mobile terminal collects to-be-verified fingerprint information of the user. Further, the application sends the verification information to the first operating system. The first operating system determines, according to the verification information, a verification type (such as the first-type verification or the second-type verification) of the to-be-verified fingerprint information. Further, the first operating system flexibly selects, according to the verification type result, a corresponding fingerprint interface to perform fingerprint verification on the to-be-verified fingerprint information. (1) If the verification type is the first-type verification (such as the non-security verification, the high-speed verification, or the low-threshold verification), the first operating system directly invokes the first fingerprint interface to verify the to-be-verified fingerprint information. (2) If the verification type is the second-type verification (such as the security verification, the low-speed verification, or the high-threshold verification), the first operating system invokes the system switchover interface to switch to the second operating system, and the second fingerprint interface is invoked in the second operating system to verify the to-be-verified fingerprint information.

In this embodiment of the present disclosure, optionally, when a user triggers a fingerprint verification request operation, an application that runs in the first operating system of the mobile terminal may generate corresponding verification information according to a type of the fingerprint verification request operation, or the application obtains, by using a network-side server, verification information corresponding to the fingerprint verification request operation. In addition, the fingerprint sensor in the mobile terminal collects to-be-verified fingerprint information of the user. Further, the application directly determines, according to the verification information, a verification type (such as the first-type verification or the second-type verification) of the to-be-verified fingerprint information. Further, the application flexibly selects, according to the verification type of the to-be-verified fingerprint information, a corresponding fingerprint interface to perform fingerprint verification on the to-be-verified fingerprint information. (1) If the verification type is the first-type verification (such as the non-security verification, the high-speed verification, or the low-threshold verification), the application directly invokes the first fingerprint interface in the first operating system to verify the to-be-verified fingerprint information. (2) If the verification type is the second-type verification (such as the security verification, the low-speed verification, or the high-threshold verification), the application invokes the system switchover interface in the first operating system to switch to the second operating system, and invokes the second fingerprint interface in the second operating system to verify the to-be-verified fingerprint information.

Optionally, in this embodiment of the present disclosure, the invoking, by the mobile terminal, the first fingerprint interface or the second fingerprint interface to verify the to-be-verified fingerprint information includes: invoking, by the application, a corresponding fingerprint sensor driver module by using the first fingerprint interface or the second fingerprint interface, and invoking, by the fingerprint sensor driver module, the fingerprint sensor to perform fingerprint verification on the to-be-verified fingerprint information; or invoking, by the first operating system, a corresponding fingerprint sensor driver module by using the first fingerprint interface or the second fingerprint interface, and further, invoking, by the fingerprint sensor driver module, the fingerprint sensor to perform fingerprint verification on the to-be-verified fingerprint information.

Optionally, in this embodiment of the present disclosure, the invoking, by the mobile terminal, the first fingerprint interface or the second fingerprint interface to verify the to-be-verified fingerprint information includes: invoking, by the application, a verification program in a memory by using the first fingerprint interface or the second fingerprint interface, to perform fingerprint verification on the to-be-verified fingerprint information; or invoking, by the first operating system, a verification program in a memory by using the first fingerprint interface or the second fingerprint interface, to perform fingerprint verification on the to-be-verified fingerprint information.

In this embodiment of the present disclosure, the mobile terminal obtains the verification information and the to-be-verified fingerprint information in the first operating system. Further, if the mobile terminal determines, in the first operating system according to the verification information, to perform first-type verification (such as the non-security verification, the high-speed verification, or the low-threshold verification) on the to-be-verified fingerprint information, the mobile terminal directly invokes the first fingerprint interface in the first operating system to verify the to-be-verified fingerprint information. If the mobile terminal determines, in the first operating system according to the verification information, to perform second-type verification (such as the security verification, the low-speed verification, or the high-threshold verification) on the to-be-verified fingerprint information, the mobile terminal switches from the first operating system to the second operating system, and invokes the second fingerprint interface in the second operating system to verify the to-be-verified fingerprint information. It can be learned that, in this embodiment, the mobile terminal may flexibly select, according to the verification type (such as the security verification/non-security verification, the high-speed verification/low-speed verification, or the low-threshold verification/high-threshold verification), a corresponding fingerprint interface to perform fingerprint verification on the to-be-verified fingerprint information.

Optionally, before the obtaining, by the mobile terminal, verification information and to-be-verified fingerprint information in the first operating system, the method further includes: determining, by the mobile terminal in the first operating system, whether the first operating system and the second operating system separately provide a corresponding fingerprint interface; and if the mobile terminal determines, in the first operating system, that the first operating system includes the first fingerprint interface and the second operating system includes the second fingerprint interface, recording, by the mobile terminal, operating system environment information in the first operating system, where the operating system environment information includes information indicating that the first operating system includes the first fingerprint interface and the second operating system includes the second fingerprint interface.

In this embodiment of the present disclosure, before the mobile terminal obtains the verification information and the to-be-verified fingerprint information in the first operating system, optionally, an application on the mobile terminal sends a query request to the first operating system by using a query interface provided by the first operating system (where the query request is used to query information about a fingerprint interface included in the first operating system and/or the second operating system); after receiving the query request, the first operating system returns the operating system environment information to the application by using the query interface (optionally, the operating system environment information is used to indicate whether the first operating system and the second operating system separately provide a fingerprint interface), so that the application determines, according to the operating system environment information, whether the first operating system and the second operating system separately provide a corresponding fingerprint interface. Optionally, to avoid that the application needs to determine, each time the application performs fingerprint verification, whether the first operating system and the second operating system separately provide a corresponding fingerprint interface, in this embodiment of the present disclosure, after the determining, by the application, whether the first operating system and the second operating system separately provide a corresponding fingerprint interface, the method further includes: recording the operating system environment information, where the operating system environment information is used to indicate whether the first operating system and the second operating system separately provide a fingerprint interface. If the first operating system includes the first fingerprint interface and the second operating system includes the second fingerprint interface, the recorded operating system environment information includes the information indicating that the first operating system includes the first fingerprint interface and the second operating system includes the second fingerprint interface.

Figure 2:
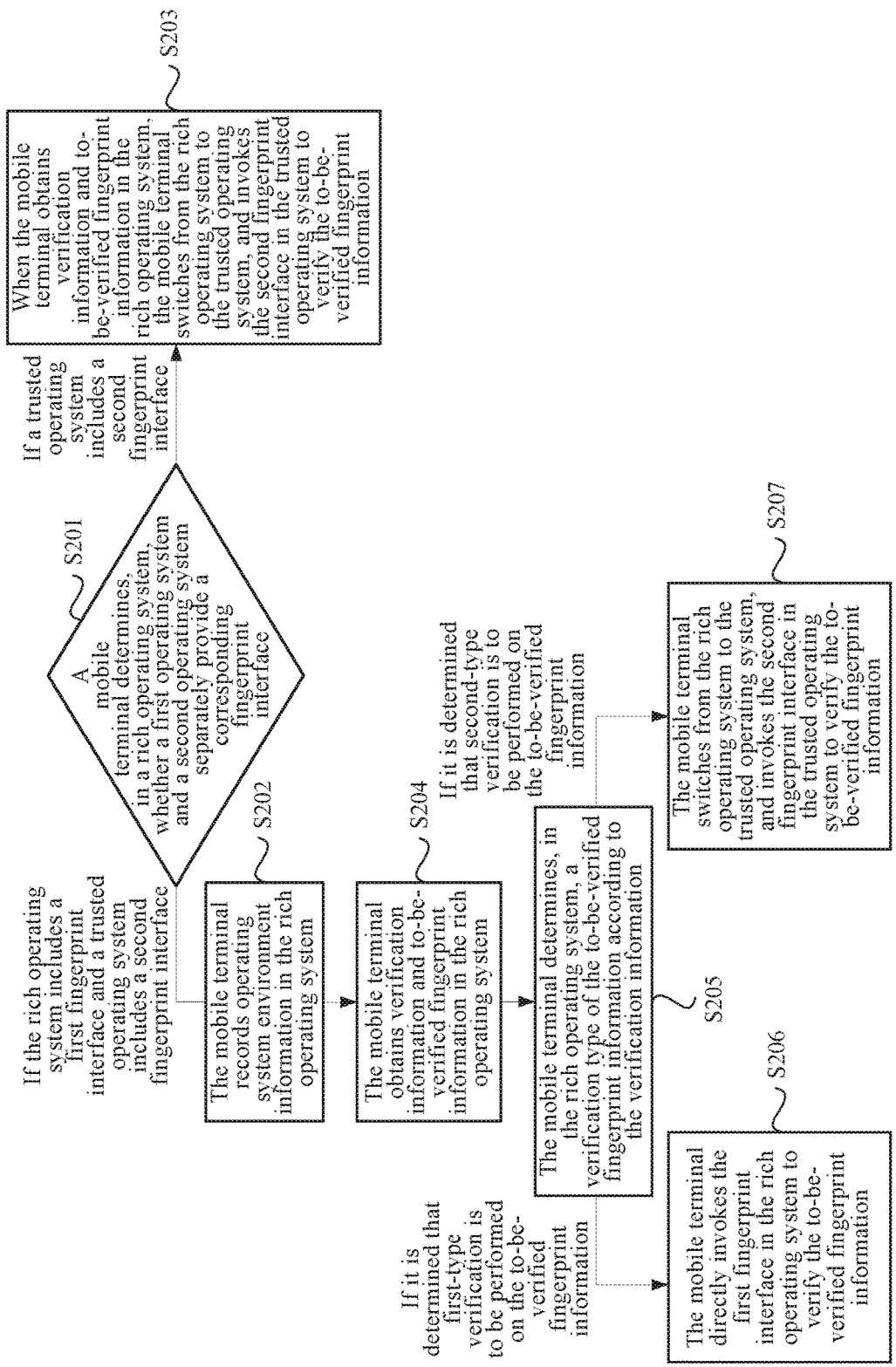
FIG. 2 is a schematic flowchart of Embodiment 2 of a fingerprint recognition method according to the present disclosure.

FIG. 2 is a schematic flowchart of Embodiment 2 of a fingerprint recognition method according to the present disclosure. On a basis of Embodiment 1, in this embodiment of the present disclosure, the fingerprint recognition method in the present disclosure is described in detail by using an example in which the first operating system is a Rich OS and the second operating system is a Trusted OS. As shown in FIG. 2, the method in this embodiment may include the following steps.

S201. The mobile terminal determines, in the rich operating system, whether the first operating system and the second operating system separately provide a corresponding fingerprint interface; and performs step S202 if the rich operating system includes a first fingerprint interface (such as an REE FingerPrint API interface) and the trusted operating system includes a second fingerprint interface (such as a TEE FingerPrint API interface), or performs step S203 if the trusted operating system includes the second fingerprint interface (such as a TEE FingerPrint API interface).

S202. The mobile terminal records operating system environment information in the rich operating system, where the operating system environment information includes information indicating that the rich operating system includes the first fingerprint interface and the trusted operating system includes the second fingerprint interface; and performs step S204.

S203. When the mobile terminal obtains verification information and to-be-verified fingerprint information in the rich operating system, the mobile terminal switches from the rich operating system to the trusted operating system, and invokes the second fingerprint interface (such as the TEE FingerPrint API interface) in the trusted operating system to verify the to-be-verified fingerprint information.

S204. The mobile terminal obtains verification information and to-be-verified fingerprint information in the rich operating system.

S205. The mobile terminal determines, in the rich operating system, a verification type of the to-be-verified fingerprint information according to the verification information; and performs step S206 if determining to perform first-type verification (such as non-security verification, high-speed verification, or low-threshold verification) on the to-be-verified fingerprint information, or performs step S207 if determining to perform second-type verification (such as security verification, low-speed verification, or high-threshold verification) on the to-be-verified fingerprint information.

S206. The mobile terminal directly invokes the first fingerprint interface (such as the REE FingerPrint API interface) in the rich operating system to verify the to-be-verified fingerprint information.

S207. The mobile terminal switches from the rich operating system to the trusted operating system, and invokes the second fingerprint interface (such as the TEE FingerPrint API interface) in the trusted operating system to verify the to-be-verified fingerprint information.

Optionally, in this embodiment of the present disclosure, the invoking, by the mobile terminal, the first fingerprint interface or the second fingerprint interface to verify the to-be-verified fingerprint information includes: invoking, by the mobile terminal, a corresponding fingerprint sensor driver module by using the first fingerprint interface or the second fingerprint interface; and further, invoking, by the fingerprint sensor driver module, a fingerprint sensor in the mobile terminal to perform fingerprint verification on the to-be-verified fingerprint information.

Optionally, in this embodiment of the present disclosure, the invoking, by the mobile terminal, the first fingerprint interface or the second fingerprint interface to verify the to-be-verified fingerprint information includes: invoking, by the mobile terminal, a verification program in a memory by using the first fingerprint interface or the second fingerprint interface, to perform fingerprint verification on the to-be-verified fingerprint information.

In conclusion, in the fingerprint recognition method in this embodiment, the mobile terminal may flexibly select, according to the verification type of the to-be-verified fingerprint information, a corresponding fingerprint interface to perform fingerprint verification on the to-be-verified fingerprint information. For the first-type verification (such as the non-security verification, high-speed verification, or low-threshold verification), the mobile terminal directly invokes the first fingerprint interface in the first operating system to verify the to-be-verified fingerprint information, without a need of switching to the second operating system and invoking the second fingerprint interface to verify the to-be-verified fingerprint information. Further, verification efficiency of the first-type verification is improved, and a resource of the second operating system is saved.

Optionally, after the obtaining, by the mobile terminal, verification information and to-be-verified fingerprint information in the first operating system, the method further includes: determining, by the mobile terminal in the first operating system, whether the first operating system and the second operating system separately provide a corresponding fingerprint interface; and if the mobile terminal determines, in the first operating system, that the first operating system includes the first fingerprint interface and the second operating system includes the second fingerprint interface, determining, by the mobile terminal in the first operating system, the verification type of the to-be-verified fingerprint information according to the verification information.

In this embodiment of the present disclosure, after the mobile terminal obtains the verification information and the to-be-verified fingerprint information in the first operating system, optionally, an application on the mobile terminal sends a query request to the first operating system by using a query interface provided by the first operating system (where the query request is used to query information about a fingerprint interface included in the first operating system and/or the second operating system); after receiving the query request, the first operating system returns the operating system environment information to the application by using the query interface (optionally, the operating system environment information is used to indicate whether the first operating system and the second operating system separately provide a fingerprint interface), so that the application determines, according to the operating system environment information, whether the first operating system and the second operating system separately provide a corresponding fingerprint interface. If the application determines, in the first operating system according to the operating system environment information, that the first operating system includes the first fingerprint interface and the second operating system includes the second fingerprint interface, the application performs the step of determining, in the first operating system according to the verification information, the verification type of the to-be-verified fingerprint information.

Figure 3:
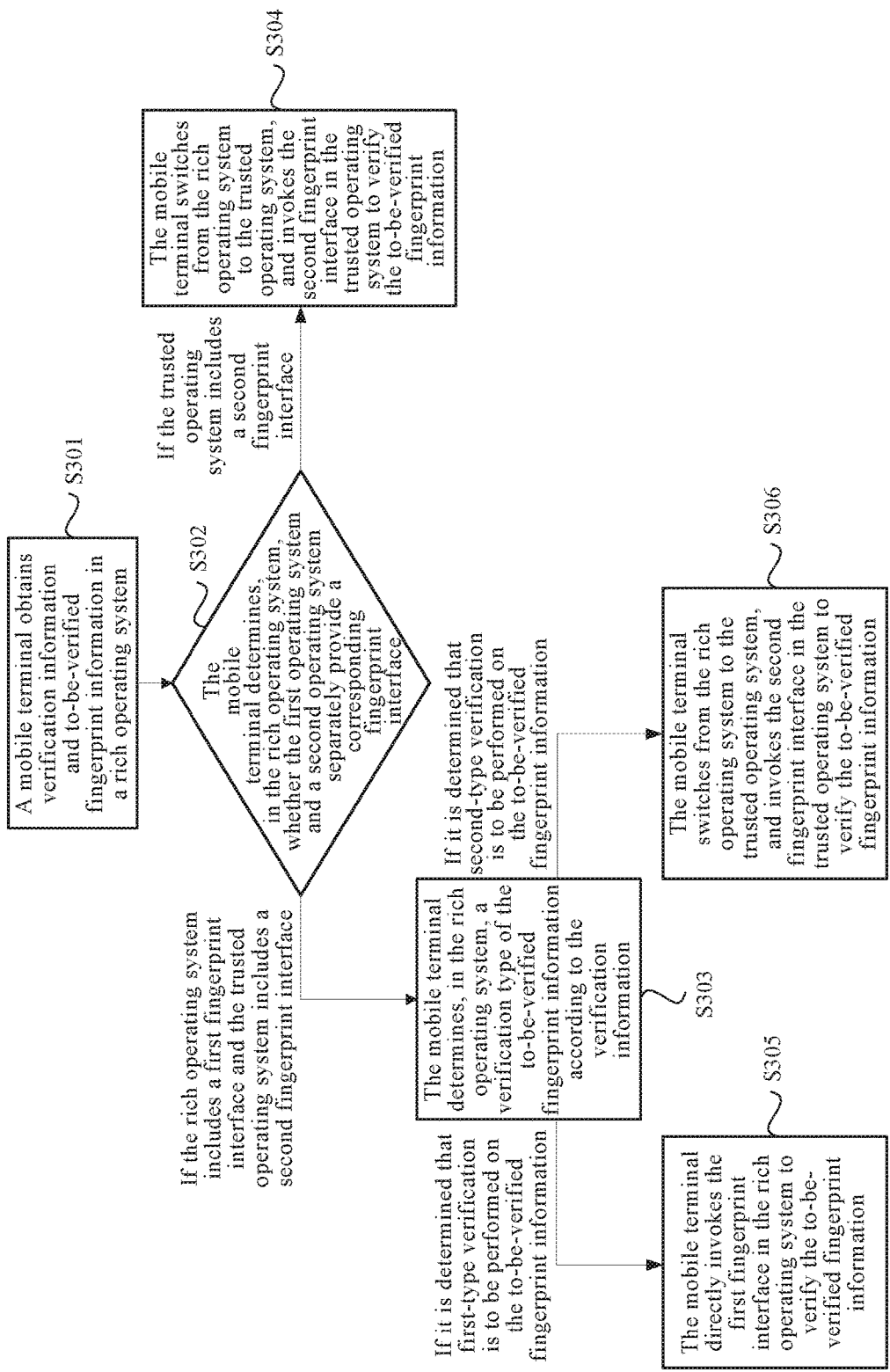
FIG. 3 is a schematic flowchart of Embodiment 3 of a fingerprint recognition method according to the present disclosure.

FIG. 3 is a schematic flowchart of Embodiment 3 of a fingerprint recognition method according to the present disclosure. On a basis of Embodiment 1, in this embodiment of the present disclosure, the fingerprint recognition method in the present disclosure is described in detail by using an example in which the first operating system is a Rich OS and the second operating system is a Trusted OS. As shown in FIG. 3, the method in this embodiment may include the following steps.

S301. The mobile terminal obtains verification information and to-be-verified fingerprint information in the rich operating system.

S302. The mobile terminal determines, in the rich operating system, whether the first operating system and the second operating system separately provide a corresponding fingerprint interface; and performs step S303 if the rich operating system includes a first fingerprint interface (such as an REE FingerPrint API interface) and the trusted operating system includes a second fingerprint interface (such as a TEE FingerPrint API interface), or performs step S304 if the trusted operating system includes the second fingerprint interface (such as a TEE FingerPrint API interface).

S303. The mobile terminal determines, in the rich operating system, a verification type of the to-be-verified fingerprint information according to the verification information; and performs step S305 if determining to perform first-type verification (such as non-security verification, high-speed verification, or low-threshold verification) on the to-be-verified fingerprint information, or performs step S306 if determining to perform second-type verification (such as security verification, low-speed verification, or high-threshold verification) on the to-be-verified fingerprint information.

S304. The mobile terminal switches from the rich operating system to the trusted operating system, and invokes the second fingerprint interface (such as the TEE FingerPrint API interface) in the trusted operating system to verify the to-be-verified fingerprint information.

S305. The mobile terminal directly invokes the first fingerprint interface in the rich operating system to verify the to-be-verified fingerprint information.

S306. The mobile terminal switches from the rich operating system to the trusted operating system, and invokes the second fingerprint interface (such as the TEE FingerPrint API interface) in the trusted operating system to verify the to-be-verified fingerprint information.

Optionally, in this embodiment of the present disclosure, the invoking, by the mobile terminal, the first fingerprint interface or the second fingerprint interface to verify the to-be-verified fingerprint information includes: invoking, by the mobile terminal, a corresponding fingerprint sensor driver module by using the first fingerprint interface or the second fingerprint interface; and invoking, by the fingerprint sensor driver module, a fingerprint sensor in the mobile terminal to perform fingerprint verification on the to-be-verified fingerprint information.

Optionally, in this embodiment of the present disclosure, the invoking, by the mobile terminal, the first fingerprint interface or the second fingerprint interface to verify the to-be-verified fingerprint information includes: invoking, by the mobile terminal, a verification program in a memory by using the first fingerprint interface or the second fingerprint interface, to perform fingerprint verification on the to-be-verified fingerprint information.

In conclusion, in the fingerprint recognition method in this embodiment, the mobile terminal may flexibly select, according to the verification type of the to-be-verified fingerprint information, a corresponding fingerprint interface to perform fingerprint verification on the to-be-verified fingerprint information. For the first-type verification (such as the non-security verification, high-speed verification, or low-threshold verification), the mobile terminal directly invokes the first fingerprint interface in the first operating system to verify the to-be-verified fingerprint information, without a need of switching to the second operating system and invoking the second fingerprint interface to verify the to-be-verified fingerprint information. Further, verification efficiency of the first-type verification is improved, and a resource of the second operating system is saved.

Figure 4:
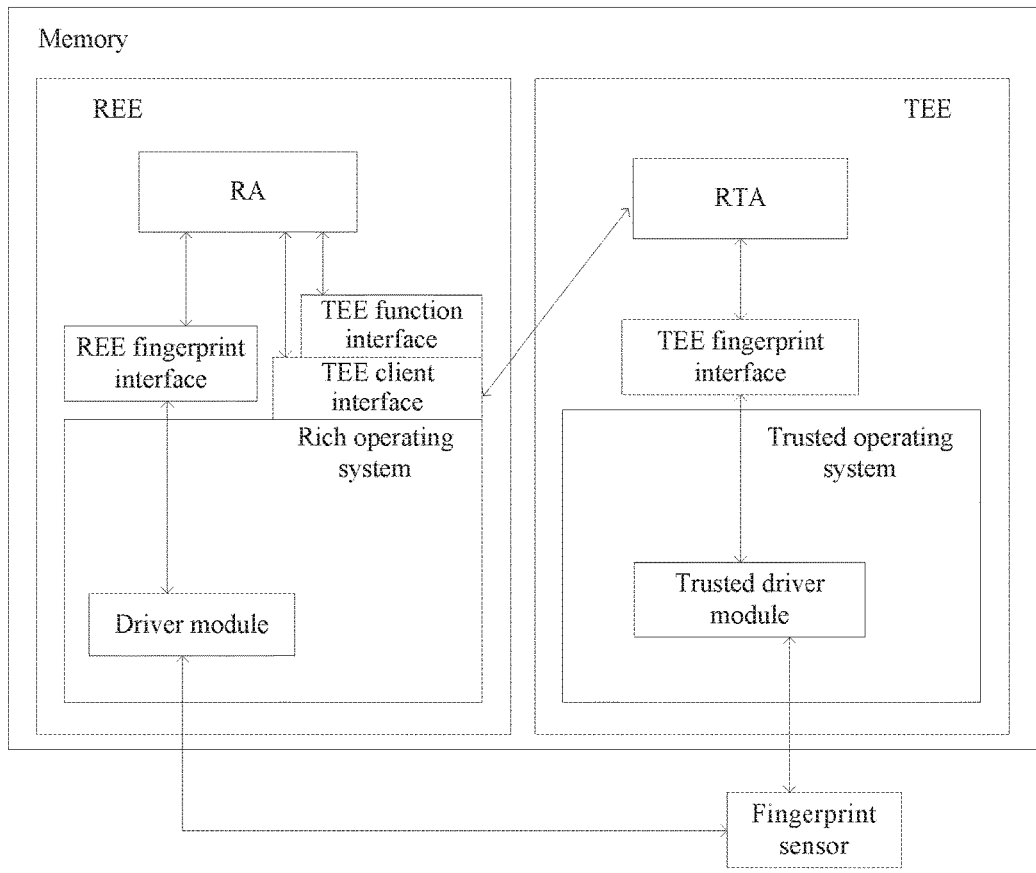
FIG. 4 is a schematic structural architectural diagram of fingerprint verification according to the present disclosure.

FIG. 4 is a schematic structural architectural diagram of fingerprint verification according to the present disclosure. As shown in FIG. 4, an REE and a TEE coexist in a memory of a mobile terminal 40. The REE includes: a CA installed on a storage unit in the REE, a TEE function interface (such as a TEE Function API), a TEE client interface (such as a TEE Client API) (where the TEE function interface and the TEE client interface are system switchover interfaces, configured to invoke a trusted application TA in the TEE, that is, implement switchover from the REE to the TEE), a Rich OS, an REE fingerprint interface (such as an REE FingerPrint API, that is, the first fingerprint interface of the Rich OS, configured to invoke the fingerprint sensor to perform fingerprint verification), and a driver module that is in the Rich OS and that is corresponding to the REE FingerPrint API interface. Optionally, the REE FingerPrint API interface is configured to invoke the driver module corresponding to the REE FingerPrint API interface. Further, the driver module invokes the fingerprint sensor to perform fingerprint verification. The TEE includes: an application TA installed on a storage unit in the TEE (where the TA may provide a related security function for a CA in the REE or another TA in the TEE), a Trusted OS, a TEE fingerprint interface (that is, the second fingerprint interface in the Trusted OS, such as a TEE FingerPrint API, configured to invoke the fingerprint sensor to perform fingerprint verification), and a trusted driver module corresponding to the TEE FingerPrint API interface. Optionally, the TEE FingerPrint API interface is configured to invoke the trusted driver module corresponding to the TEE FingerPrint API interface. Further, the trusted driver module invokes the fingerprint sensor to perform fingerprint verification. As shown in FIG. 4, the mobile terminal separately provides a fingerprint interface for the TEE and the REE (for example, the REE FingerPrint API interface in the REE, and the TEE FingerPrint API interface in the TEE) to invoke the fingerprint sensor. That is, the REE and the TEE provide two fingerprint authentication manners at different levels. The REE provides the first fingerprint interface (such as the REE FingerPrint API interface) for first-type verification. The TEE provides the second fingerprint interface (such as the TEE FingerPrint API interface) for second-type verification. Therefore, the mobile terminal may flexibly select, according to a verification type of to-be-verified fingerprint information, a corresponding fingerprint interface to perform fingerprint verification on the to-be-verified fingerprint information.

In this embodiment of the present disclosure, a fingerprint recognition method in the present disclosure is described in detail based on FIG. 4. When a user triggers a fingerprint verification request operation, the CA running in the Rich OS on the mobile terminal obtains verification information that is corresponding to the fingerprint verification request operation and to-be-verified fingerprint information of the user that is collected by the fingerprint sensor. Further, the CA sends the verification information to the Rich OS. The Rich OS determines, according to the verification information, a verification type (such as the first-type verification or the second-type verification) of the to-be-verified fingerprint information. Further, the Rich OS returns a determined verification type result (such as the first-type verification or the second-type verification) to the CA, so that the CA flexibly selects, according to the verification type result, a corresponding fingerprint interface to perform fingerprint verification on the to-be-verified fingerprint information. (1) If the verification type is the first-type verification (such as non-security verification, high-speed verification, or low-threshold verification), the CA invokes the driver module in the Rich OS by using the first fingerprint interface. Further, the driver module invokes the fingerprint sensor to verify the to-be-verified fingerprint information. (2) If the verification type is the second-type verification (such as security verification, low-speed verification, or high-threshold verification), the CA invokes a system switchover interface (such as the TEE function interface or the TEE client interface) in the Rich OS to switch to the Trusted OS, and invokes the trusted driver module in the Trusted OS by using the second fingerprint interface. Further, the trusted driver module invokes the fingerprint sensor to verify the to-be-verified fingerprint information. Further, the CA receives a verification result returned by the fingerprint sensor.

Optionally, in this embodiment of the present disclosure, when a user triggers a fingerprint verification request operation, the CA running in the Rich OS on the mobile terminal obtains verification information that is corresponding to the fingerprint verification request operation and to-be-verified fingerprint information of the user that is collected by the fingerprint sensor. Further, the CA directly determines, according to the verification information, a verification type (such as the first-type verification or the second-type verification) of the to-be-verified fingerprint information. Further, the CA flexibly selects, according to the verification type of the to-be-verified fingerprint information, a corresponding fingerprint interface to perform fingerprint verification on the to-be-verified fingerprint information. (1) If the verification type is the first-type verification (such as non-security verification, high-speed verification, or low-threshold verification), the CA invokes the driver module in the Rich OS by using the first fingerprint interface. Further, the driver module invokes the fingerprint sensor to verify the to-be-verified fingerprint information. (2) If the verification type is the second-type verification (such as security verification, low-speed verification, or high-threshold verification), the CA invokes the system switchover interface in the Rich OS to switch to the Trusted OS, and invokes the trusted driver module in the Trusted OS by using the second fingerprint interface. Further, the trusted driver module invokes the fingerprint sensor to verify the to-be-verified fingerprint information. Further, the CA receives a verification result returned by the fingerprint sensor.

Figure 5:
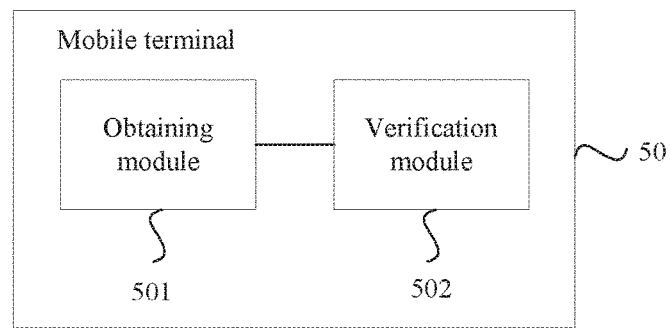
FIG. 5 is a schematic structural diagram of Embodiment 1 of a mobile terminal according to the present disclosure.

FIG. 5 is a schematic structural diagram of Embodiment 1 of a mobile terminal according to the present disclosure. The mobile terminal 50 provided in this embodiment includes a first operating system and a second operating system. The first operating system and the second operating system independently run on the mobile terminal. The first operating system includes a first fingerprint interface. The second operating system includes a second fingerprint interface. As shown in FIG. 5, the mobile terminal 50 in this embodiment may include an obtaining module 501 and a verification module 502.

The obtaining module 501 is configured to obtain verification information and to-be-verified fingerprint information in the first operating system.

The verification module 502 is configured to: if it is determined, in the first operating system according to the verification information, that first-type verification is to be performed on the to-be-verified fingerprint information, directly invoke the first fingerprint interface in the first operating system to verify the to-be-verified fingerprint information; or if it is determined, in the first operating system according to the verification information, that second-type verification is to be performed on the to-be-verified fingerprint information, switch from the first operating system to the second operating system, and invoke the second fingerprint interface in the second operating system to verify the to-be-verified fingerprint information.

Optionally, the verification information includes a security level. The verification module 502 is further configured to: if the verification security level is lower than a first preset security level, determine, in the first operating system according to the verification information, to perform the first-type verification on the to-be-verified fingerprint information; or if the verification security level is higher than or equal to the first preset security level, determine, in the first operating system according to the verification information, to perform the second-type verification on the to-be-verified fingerprint information.

Optionally, the verification information includes a verification speed. The verification module 502 is further configured to: if the verification speed is greater than or equal to a first preset verification speed, determine, in the first operating system according to the verification information, to perform the first-type verification on the to-be-verified fingerprint information; or if the verification speed is less than the first preset verification speed, determine, in the first operating system according to the verification information, to perform the second-type verification on the to-be-verified fingerprint information.

Optionally, the verification information includes a verification threshold. The verification module 502 is further configured to: if the verification threshold is less than a first preset verification threshold, determine, in the first operating system according to the verification information, to perform the first-type verification on the to-be-verified fingerprint information; or if the verification threshold is greater than or equal to the first preset verification threshold, determine, in the first operating system according to the verification information, to perform the second-type verification on the to-be-verified fingerprint information.

Optionally, the verification information includes at least two types of the following verification information: a verification security level, a verification threshold, or a verification speed. The verification module 502 is further configured to: obtain, in the first operating system, priorities of the at least two types of verification information; and determine, in the first operating system according to verification information that has a highest priority in the at least two types of verification information, a verification type of verifying the to-be-verified fingerprint information, where the verification type includes one of the following: the first-type verification or the second-type verification.

Optionally, the verification information includes a verification security level and a verification speed. The verification module 502 is further configured to: if the verification security level is higher than or equal to a first preset security level and the verification speed is less than a first preset verification speed, determine, in the first operating system according to the verification information, to perform the second-type verification on the to-be-verified fingerprint information; or if the verification security level is lower than the first preset security level and the verification speed is greater than or equal to the first preset verification speed, determine, in the first operating system according to the verification information, to perform the first-type verification on the to-be-verified fingerprint information.

Optionally, the verification information includes a verification security level, a verification threshold, and a verification speed. The verification module 502 is further configured to: if the verification security level is higher than or equal to a first preset security level, the verification threshold is greater than or equal to a first preset verification threshold, and the verification speed is less than a first preset verification speed, determine, in the first operating system according to the verification information, to perform the second-type verification on the to-be-verified fingerprint information; or if the verification security level is lower than the first preset security level, the verification threshold is less than the first preset verification threshold, and the verification speed is greater than or equal to the first preset verification speed, determine, in the first operating system according to the verification information, to perform the first-type verification on the to-be-verified fingerprint information.

The mobile terminal in this embodiment may be configured to execute the technical solution in any embodiment of the fingerprint recognition method in the present disclosure. An implementation principle and a technical effect of the mobile terminal are similar to those of the technical solution. Details are not described herein.

Figure 6A:
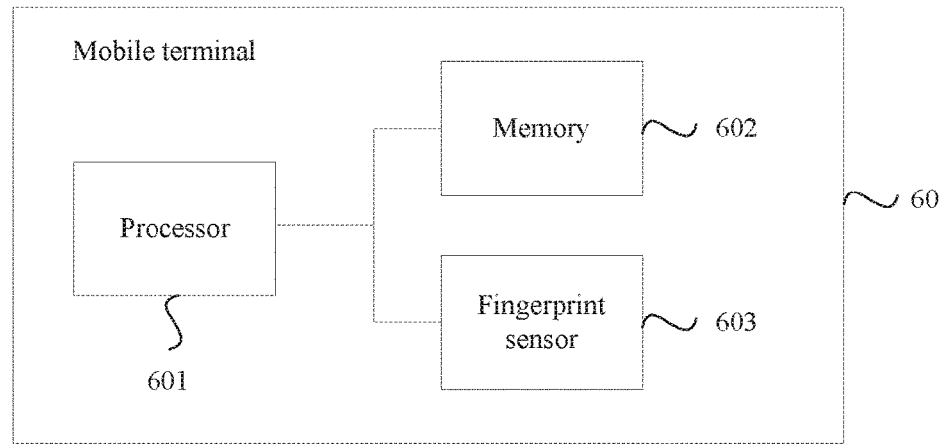
FIG. 6A is a schematic structural diagram of Embodiment 2 of a mobile terminal according to the present disclosure.

FIG. 6A is a schematic structural diagram of Embodiment 2 of a mobile terminal according to the present disclosure. As shown in FIG. 6A, the mobile terminal 60 provided in this embodiment may include a processor 601, a memory 602, and a fingerprint sensor 603.

The memory 602 is configured to store a first operating system and a second operating system, where the first operating system and the second operating system independently run on the processor, the first operating system includes a first fingerprint interface, and the second operating system includes a second fingerprint interface.

The fingerprint sensor 603 is configured to collect to-be-verified fingerprint information.

The processor 601 is configured to: obtain verification information in the first operating system; and if it is determined, in the first operating system according to the verification information, that first-type verification is to be performed on the to-be-verified fingerprint information, directly invoke the first fingerprint interface in the first operating system to verify the to-be-verified fingerprint information; or if it is determined, in the first operating system according to the verification information, that second-type verification is to be performed on the to-be-verified fingerprint information, switch from the first operating system to the second operating system, and invoke the second fingerprint interface in the second operating system to verify the to-be-verified fingerprint information.

In this embodiment of the present disclosure, optionally, when a touchscreen receives a fingerprint verification request operation triggered by a user, the processor runs, in the first operating system, an application on the mobile terminal to obtain verification information corresponding to the fingerprint verification request operation, and the processor activates the fingerprint sensor in the mobile terminal to collect to-be-verified fingerprint information of the user. The processor runs the application to send the verification information to the first operating system. The processor runs the first operating system to determine, according to the verification information, a verification type of the to-be-verified fingerprint information. The processor runs the first operating system to return a verification type result to the application. The processor runs the application to invoke a corresponding fingerprint interface to perform fingerprint verification on the to-be-verified fingerprint information. If the verification type is the first-type verification, the processor runs, in the first operating system, the application to directly invoke the first fingerprint interface to verify the to-be-verified fingerprint information. If the verification type is the second-type verification, the processor runs the application to switch from the first operating system to the second operating system, and invoke the second fingerprint interface in the second operating system to verify the to-be-verified fingerprint information.

Optionally, in this embodiment of the present disclosure, when a touchscreen receives a fingerprint verification request operation triggered by a user, the processor runs, in the first operating system, an application on the mobile terminal to obtain verification information corresponding to the fingerprint verification request operation, and the processor activates the fingerprint sensor in the mobile terminal to collect to-be-verified fingerprint information of the user. The processor runs the application to send the verification information to the first operating system. The processor runs the first operating system to determine, according to the verification information, a verification type of the to-be-verified fingerprint information. The processor runs the first operating system to directly invoke a corresponding fingerprint interface to perform fingerprint verification on the to-be-verified fingerprint information. If the verification type is the first-type verification, the processor runs the first operating system to directly invoke the first fingerprint interface to verify the to-be-verified fingerprint information. If the verification type is the second-type verification, the processor switches from the first operating system to the second operating system, and invokes the second fingerprint interface in the second operating system to verify the to-be-verified fingerprint information.

Optionally, in this embodiment of the present disclosure, when a touchscreen receives a fingerprint verification request operation triggered by a user, the processor runs, in the first operating system, an application on the mobile terminal to obtain verification information corresponding to the fingerprint verification request operation, and the processor activates the fingerprint sensor in the mobile terminal to collect to-be-verified fingerprint information of the user. The processor runs the application to determine, according to the verification information, a verification type of the to-be-verified fingerprint information. The processor runs the application to invoke a corresponding fingerprint interface to perform fingerprint verification on the to-be-verified fingerprint information. If the verification type is the first-type verification, the processor runs, in the first operating system, the application to directly invoke the first fingerprint interface to verify the to-be-verified fingerprint information. If the verification type is the second-type verification, the processor runs the application to switch from the first operating system to the second operating system, and invoke the second fingerprint interface in the second operating system to verify the to-be-verified fingerprint information.

Optionally, in this embodiment of the present disclosure, the processor runs the application to invoke, by using the first fingerprint interface or the second fingerprint interface, a corresponding fingerprint sensor driver module. Further, the processor runs the fingerprint sensor driver module to invoke the fingerprint sensor to perform fingerprint verification on the to-be-verified fingerprint information. Alternatively, the processor runs the first operating system to invoke, by using the first fingerprint interface or the second fingerprint interface, a corresponding fingerprint sensor driver module. Further, the processor runs the fingerprint sensor driver module to invoke the fingerprint sensor to perform fingerprint verification on the to-be-verified fingerprint information. Alternatively, the processor runs the first fingerprint interface or the second fingerprint interface, and then invokes a verification program in the memory to perform fingerprint verification on the to-be-verified fingerprint information.

Figure 6B:
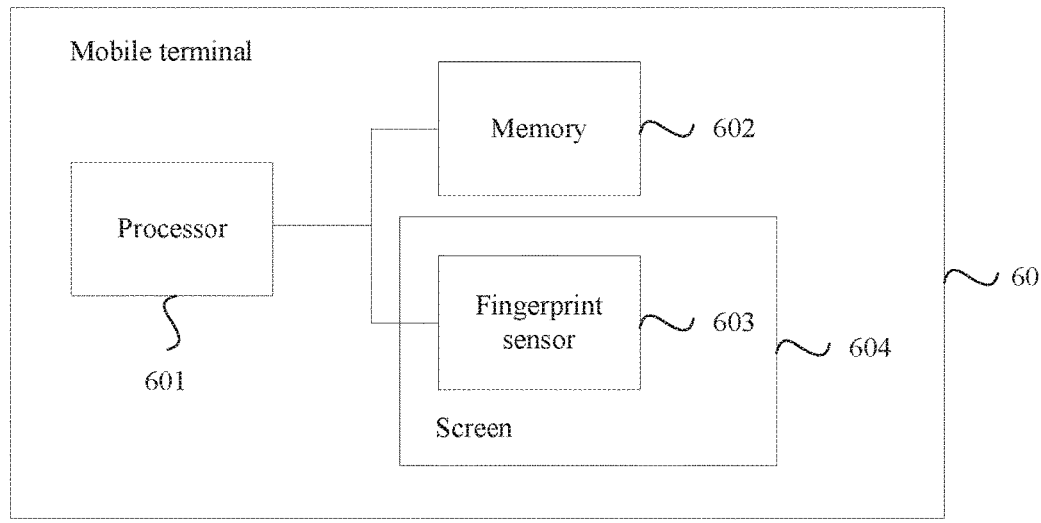
FIG. 6B is a schematic structural diagram of Embodiment 3 of a mobile terminal according to the present disclosure.

Optionally, in another implementation, referring to FIG. 6B, FIG. 6B is a schematic structural diagram of Embodiment 3 of a mobile terminal according to the present disclosure. On a basis of the implementation shown in FIG. 6A, the mobile terminal 60 further includes a screen 604. The screen 604 includes the fingerprint sensor 603.

Optionally, that when a touchscreen receives a fingerprint verification request operation triggered by a user, the processor runs, in the first operating system, an application on the mobile terminal to obtain verification information corresponding to the fingerprint verification request operation, and the processor activates the fingerprint sensor in the mobile terminal to collect to-be-verified fingerprint information of the user includes: when a fingerprint verification request key area displayed on the screen 604 of the mobile terminal receives the fingerprint verification request operation triggered by the user, running, by the processor 601, the application on the mobile terminal to generate the verification information corresponding to the fingerprint verification request operation, or running, by the processor 601, the application to obtain the verification information by using a network-side server; and activating, by the processor 601, the fingerprint sensor 603 corresponding to the key area (optionally, activating all fingerprint sensors 603 on the screen 604), so that the fingerprint sensor 603 collects the to-be-verified fingerprint information of the user.

Optionally, in another implementation, that when a touchscreen receives a fingerprint verification request operation triggered by a user, the processor runs, in the first operating system, an application on the mobile terminal to obtain verification information corresponding to the fingerprint verification request operation, and the processor activates the fingerprint sensor in the mobile terminal to collect to-be-verified fingerprint information of the user includes: when a fingerprint verification request key area displayed on the screen of the mobile terminal receives the fingerprint verification request operation triggered by the user, running, by the processor, the application on the mobile terminal to generate the verification information corresponding to the fingerprint verification request operation, or running, by the processor, the application to obtain the verification information by using a network-side server; and when the user presses a function key area of the mobile terminal with a finger, collecting, by a fingerprint sensor corresponding to the function key area, the to-be-verified fingerprint information of the user, where optionally, the function key may be a home key.

Optionally, the verification information includes a verification security level. The processor is further configured to: if the verification security level is lower than a first preset security level, determine, in the first operating system according to the verification information, to perform the first-type verification on the to-be-verified fingerprint information; or if the verification security level is higher than or equal to the first preset security level, determine, in the first operating system according to the verification information, to perform the second-type verification on the to-be-verified fingerprint information.

Optionally, the verification information includes a verification speed. The processor is further configured to: if the verification speed is greater than or equal to a first preset verification speed, determine, in the first operating system according to the verification information, to perform the first-type verification on the to-be-verified fingerprint information; or if the verification speed is less than the first preset verification speed, determine, in the first operating system according to the verification information, to perform the second-type verification on the to-be-verified fingerprint information.

Optionally, the verification information includes a verification threshold. The processor is further configured to: if the verification threshold is less than a first preset verification threshold, determine, in the first operating system according to the verification information, to perform the first-type verification on the to-be-verified fingerprint information; or if the verification threshold is greater than or equal to the first preset verification threshold, determine, in the first operating system according to the verification information, to perform the second-type verification on the to-be-verified fingerprint information.

Optionally, the verification information includes at least two types of the following verification information: a verification security level, a verification threshold, or a verification speed. The processor is further configured to: obtain, in the first operating system, priorities of the at least two types of verification information; and determine, in the first operating system according to verification information that has a highest priority in the at least two types of verification information, a verification type of verifying the to-be-verified fingerprint information, where the verification type includes one of the following: the first-type verification or the second-type verification.

Optionally, the verification information includes a verification security level and a verification speed. The processor is further configured to: if the verification security level is higher than or equal to a first preset security level and the verification speed is less than a first preset verification speed, determine, in the first operating system according to the verification information, to perform the second-type verification on the to-be-verified fingerprint information; or if the verification security level is lower than the first preset security level and the verification speed is greater than or equal to the first preset verification speed, determine, in the first operating system according to the verification information, to perform the first-type verification on the to-be-verified fingerprint information.

Optionally, the verification information includes a verification security level, a verification threshold, and a verification speed. The processor is further configured to: if the verification security level is higher than or equal to a first preset security level, the verification threshold is greater than or equal to a first preset verification threshold, and the verification speed is less than a first preset verification speed, determine, in the first operating system according to the verification information, to perform the second-type verification on the to-be-verified fingerprint information; or if the verification security level is lower than the first preset security level, the verification threshold is less than the first preset verification threshold, and the verification speed is greater than or equal to the first preset verification speed, determine, in the first operating system according to the verification information, to perform the first-type verification on the to-be-verified fingerprint information.

In the several embodiments provided in the present disclosure, it should be understood that the disclosed apparatus and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, reference may be made to a corresponding process in the foregoing method embodiments, and details are not described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A fingerprint recognition method, comprising:
    obtaining, by a mobile terminal, verification information and to-be-verified fingerprint information in a first operating system, the mobile terminal comprising the first operating system and a second operating system, the first operating system and the second operating system independently running on the mobile terminal, the first operating system comprising a first fingerprint interface, the second operating system comprising a second fingerprint interface, and the verification information comprising multiple types of verification information including a verification speed and at least one of a verification security level or a verification threshold;
    obtaining, by the first operating system, priorities of the multiple types of verification information;
    determining, by the first operating system according to the verification information that has a highest priority, whether to perform the first-type verification or the second-type verification on the to-be-verified fingerprint information such that when the verification speed has the highest priority, the first operating system determines to perform the first-type verification on the to-be-verified fingerprint information when the verification speed is greater than a first preset verification speed, and determines to perform the second-type verification on the to-be-verified fingerprint information when the verification speed is less than the first preset verification speed;
    directly invoking, by the mobile terminal, the first fingerprint interface in the first operating system to verify the to-be-verified fingerprint information when the first operating system determines to perform first-type verification on the to-be-verified fingerprint information;
    switching, by the mobile terminal, from the first operating system to the second operating system when the first operating system determines to perform second-type verification on the to-be verified fingerprint information; and
    invoking the second fingerprint interface in the second operating system to verify the to-be-verified fingerprint information when the first operating system determines to perform second-type verification on the to-be-verified fingerprint information.

2. The method according to claim 1, wherein the multiple types of verification information comprises the verification security level, the first operating system determines to perform the first-type verification on the to-be-verified fingerprint information when the verification security level is lower than a first preset security level, and the first operating system determines to perform the second-type verification on the to-be-verified fingerprint information when the verification security level is higher than the first preset security level.

3. The method according to claim 1, wherein the verification information comprises the verification threshold, the first operating system determines to perform the first-type verification on the to-be-verified fingerprint information when the verification threshold is less than a first preset verification threshold, and determines to perform the second-type verification on the to-be-verified fingerprint information when the verification threshold is greater than the first preset verification threshold.

4. The method according to claim 1, wherein the verification information comprises the verification security level and the verification speed, the first operating system determines to perform the second-type verification on the to-be-verified fingerprint information when the verification security level is higher than a first preset security level and the verification speed is less than a first preset verification speed, and the first operating system determines to perform the first-type verification on the to-be-verified fingerprint information when the verification security level is lower than the first preset security level and the verification speed is greater than the first preset verification speed.

5. The method according to claim 1, wherein the verification information comprises the verification security level, the verification threshold, and the verification speed, the first operating system determines to perform the second-type verification on the to-be-verified fingerprint information when the verification security level is higher than a first preset security level, the verification threshold is greater than a first preset verification threshold, and the verification speed is less than a first preset verification speed, and the first operating system determines to perform the first-type verification on the to-be-verified fingerprint information when the verification security level is lower than the first preset security level, the verification threshold is less than the first preset verification threshold, and the verification speed is greater than the first preset verification speed.

6. A mobile terminal, comprising:
a memory configured to store a first operating system and a second operating system, the first operating system including a first fingerprint interface, and the second operating system including a second fingerprint interface;
a fingerprint sensor configured to collect to-be-verified fingerprint information; and
a processor coupled to the memory and the fingerprint sensor and configured to:
independently run the first operating system and the second operating system;
obtain verification information in the first operating system, the verification information comprising multiple types of verification information including a verification speed and at least one of a verification security level or a verification threshold;
obtain, in the first operating system, priorities of the multiple types of verification information;
determine, in the first operating system according to the verification information that has a highest priority, whether to perform the first-type verification or the second-type verification on the to-be-verified fingerprint information such that when the verification speed has the highest priority, the first operating system determines to perform the first-type verification on the to-be-verified fingerprint information when the verification speed is greater than a first preset verification speed, and determines to perform the second-type verification on the to-be-verified fingerprint information when the verification speed is less than the first preset verification speed;
directly invoke the first fingerprint interface in the first operating system to verify the to-be-verified fingerprint information when the first operating system determines to perform the first-type verification on the to-be-verified fingerprint information; and
switch from the first operating system to the second operating system and invoke the second fingerprint interface in the second operating system to verify the to-be-verified fingerprint information when the first operating system determines to perform the second-type verification on the to-be-verified fingerprint information.

7. The mobile terminal according to claim 6, wherein the verification information comprises the verification security level, and the processor is further configured to:
determine, in the first operating system according to the verification information, to perform the first-type verification on the to-be-verified fingerprint information when the verification security level is lower than a first preset security level; and
determine, in the first operating system according to the verification information, to perform the second-type verification on the to-be-verified fingerprint information when the verification security level is higher than the first preset security level.

8. The mobile terminal according to claim 6, wherein the verification information comprises the verification threshold, and the processor is further configured to:
determine, in the first operating system according to the verification information, to perform the first-type verification on the to-be-verified fingerprint information when the verification threshold is less than a first preset verification threshold; and
determine, in the first operating system according to the verification information, to perform the second-type verification on the to-be-verified fingerprint information when the verification threshold is greater than the first preset verification threshold.

9. The mobile terminal according to claim 6, wherein the verification information comprises the verification security level and the verification speed, and the processor is further configured to:
determine, in the first operating system according to the verification information, to perform the second-type verification on the to-be-verified fingerprint information when the verification security level is higher than a first preset security level and the verification speed is less than a first preset verification speed; and
determine, in the first operating system according to the verification information, to perform the first-type verification on the to-be-verified fingerprint information when the verification security level is lower than the first preset security level and the verification speed is greater than or equal to the first preset verification speed.

10. The mobile terminal according to claim 6, wherein the verification information comprises the verification security level, the verification threshold, and the verification speed, and the processor is further configured to:
determine, in the first operating system according to the verification information, to perform the second-type verification on the to-be-verified fingerprint information when the verification security level is higher than or equal to a first preset security level, the verification threshold is greater than or equal to a first preset verification threshold, and the verification speed is less than a first preset verification speed; and
determine, in the first operating system according to the verification information, to perform the first-type verification on the to-be-verified fingerprint information when the verification security level is lower than the first preset security level, the verification threshold is less than the first preset verification threshold, and the verification speed is greater than the first preset verification speed.

* * * * *